(12) United States Patent
Porcari

(10) Patent No.: US 7,069,592 B2
(45) Date of Patent: Jun. 27, 2006

(54) WEB-BASED DOCUMENT SYSTEM

(75) Inventor: Damian Porcari, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 786 days.

(21) Appl. No.: 09/681,242

(22) Filed: Mar. 5, 2001

(65) Prior Publication Data

US 2001/0037460 A1    Nov. 1, 2001

Related U.S. Application Data

(63) Continuation-in-part of application No. 09/558,192, filed on Apr. 26, 2000.

(51) Int. Cl.
| | |
|---|---|
| G06F 17/30 | (2006.01) |
| G06F 7/04 | (2006.01) |
| G06K 9/00 | (2006.01) |
| H03M 1/68 | (2006.01) |
| H04K 1/00 | (2006.01) |

(52) U.S. Cl. .............. 726/26; 705/1; 707/1; 707/104.1; 715/530

(58) Field of Classification Search ................ 713/201; 726/26

See application file for complete search history.

(56) References Cited

U.S. PATENT DOCUMENTS

| | | |
|---|---|---|
| 4,977,520 A | 12/1990 | McGaughey, III et al. |
| 5,175,681 A | 12/1992 | Iwai et al. |
| 5,276,869 A | 1/1994 | Forrest et al. |
| 5,315,504 A * | 5/1994 | Lemble ........................ 700/90 |
| 5,317,683 A | 5/1994 | Hager et al. |
| 5,329,447 A | 7/1994 | Leedom, Jr. |
| 5,339,356 A | 8/1994 | Ishii |
| 5,345,502 A | 9/1994 | Rothenhofer |
| 5,377,355 A | 12/1994 | Hager et al. |
| 5,404,518 A | 4/1995 | Gilbertson et al. |
| 5,418,802 A | 5/1995 | Chwalck |

(Continued)

FOREIGN PATENT DOCUMENTS

EP    0475869 A2    3/1992

(Continued)

OTHER PUBLICATIONS

Metastorm e.works 5.2 software as used in the UK Patent Office—feature sheet included. Note e-work notify—active notification i.e. prompting. Note also the web site relating to this software at http://www.metastorm.com/products/overview_index.asp.

(Continued)

*Primary Examiner*—Gilberto Barron, Jr.
*Assistant Examiner*—Samson Lemma
(74) *Attorney, Agent, or Firm*—Damian Porcari

(57) ABSTRACT

A web-based document approval system that enables users to create, review and approve documents and to communicate these documents to other parties. The system includes an approval function where the document being approved is stored to a central storage area. The central storage area cannot be modified or deleted by the users. Users are invited to review and approve the document and are provided a convenient hyperlink to the specific document. The system records the date and time that each user approved the document. A central storage area interfaces with a database. The database retrieves approver and approval information and prepares an approval log. The approval log may be in the form of an XML document that easily updates other database systems.

17 Claims, 4 Drawing Sheets

U.S. PATENT DOCUMENTS

| | | | |
|---|---|---|---|
| 5,418,908 A | 5/1995 | Keller et al. | |
| 5,446,880 A | 8/1995 | Balgeman et al. | |
| 5,608,904 A | 3/1997 | Chaudhuri et al. | |
| 5,628,004 A | 5/1997 | Gormley et al. | |
| 5,675,780 A | 10/1997 | Plant-Mason et al. | |
| 5,721,832 A | 2/1998 | Westrope et al. | |
| 5,754,840 A | 5/1998 | Rivette et al. | |
| 5,758,095 A | 5/1998 | Albaum et al. | |
| 5,758,126 A | 5/1998 | Daniels et al. | |
| 5,764,898 A | 6/1998 | Tsuji et al. | |
| 5,781,901 A | 7/1998 | Kuzma | |
| 5,794,236 A | 8/1998 | Mehrle | |
| 5,797,001 A | 8/1998 | Augenbraun et al. | |
| 5,806,057 A | 9/1998 | Gormley et al. | |
| 5,809,232 A | 9/1998 | Johnson et al. | |
| 5,809,242 A | 9/1998 | Shaw et al. | |
| 5,812,795 A | 9/1998 | Horovitz et al. | |
| 5,819,301 A | 10/1998 | Rowe et al. | |
| 5,832,211 A | 11/1998 | Blakley, III et al. | |
| 5,832,220 A | 11/1998 | Johnson et al. | |
| 5,845,067 A | 12/1998 | Porter et al. | |
| 5,850,219 A | 12/1998 | Kumomura | |
| 5,852,809 A | 12/1998 | Abel et al. | |
| 5,857,181 A | 1/1999 | Augenbraun et al. | |
| 5,860,074 A | 1/1999 | Rowe et al. | |
| 5,862,323 A | 1/1999 | Blakley, III et al. | |
| 5,870,717 A | 2/1999 | Wiecha | |
| 5,875,431 A | 2/1999 | Heckman et al. | |
| 5,956,687 A | 9/1999 | Wamsley et al. | |
| 5,987,464 A | 11/1999 | Schneider | |
| 6,014,502 A | 1/2000 | Moraes | |
| 6,014,663 A | 1/2000 | Rivette et al. | |
| 6,014,668 A | 1/2000 | Tabata et al. | |
| 6,016,318 A | 1/2000 | Tomoike | |
| 6,029,067 A | 2/2000 | Pfundstein | |
| 6,032,118 A | 2/2000 | Tello et al. | |
| 6,041,303 A | 3/2000 | Mathews | |
| 6,047,315 A | 4/2000 | Tsuji et al. | |
| 6,047,325 A | 4/2000 | Jain et al. | |
| 6,072,795 A | 6/2000 | Poulter | |
| 6,073,108 A | 6/2000 | Peterson | |
| 6,073,148 A | 6/2000 | Rowe et al. | |
| 6,078,586 A | 6/2000 | Dugan et al. | |
| 6,079,020 A | 6/2000 | Liu | |
| 6,081,900 A | 6/2000 | Subramaniam et al. | |
| 6,092,113 A | 7/2000 | Maeshima et al. | |
| 6,092,200 A | 7/2000 | Muniyappa et al. | |
| 6,101,543 A | 8/2000 | Alden et al. | |
| 6,105,027 A | 8/2000 | Schneider et al. | |
| 6,115,709 A | 9/2000 | Gilmour et al. | |
| 6,119,108 A | 9/2000 | Holmes et al. | |
| 6,125,391 A | 9/2000 | Meltzer et al. | |
| 6,137,864 A | 10/2000 | Yaker | |
| 6,138,162 A | 10/2000 | Pistriotto et al. | |
| 6,141,409 A | 10/2000 | Madoch et al. | |
| 6,141,729 A | 10/2000 | Ishida et al. | |
| 6,154,738 A | 11/2000 | Call | |
| 6,154,783 A | 11/2000 | Gilmour et al. | |
| 6,158,011 A | 12/2000 | Chen et al. | |
| 6,167,448 A | 12/2000 | Hemphill et al. | |
| 6,173,311 B1 | 1/2001 | Hassett et al. | |
| 6,173,399 B1 | 1/2001 | Gilbrech | |
| 6,175,622 B1 | 1/2001 | Chiniwala et al. | |
| 6,178,505 B1 | 1/2001 | Schneider et al. | |
| 6,181,789 B1 | 1/2001 | Siegmund et al. | |
| 6,182,029 B1 | 1/2001 | Friedman | |
| 6,182,118 B1 | 1/2001 | Finney et al. | |
| 6,189,009 B1 | 2/2001 | Stratigos et al. | |
| 6,192,407 B1 | 2/2001 | Smith et al. | |
| 6,434,580 B1* | 8/2002 | Takano et al. | 715/530 |

FOREIGN PATENT DOCUMENTS

| | | |
|---|---|---|
| EP | 1049027 A2 | 2/2000 |
| JP | 10126408 | 5/1998 |
| NL | 9100425 | 3/1991 |
| WO | WO 00/54185 | 9/2000 |
| WO | WO 01/08031 | 2/2001 |
| WO | WO 01/08031 A2 | 2/2001 |
| WO | WO 01/26002 A1 | 4/2001 |
| WO | WO 01/35277 A1 | 5/2001 |

OTHER PUBLICATIONS

IBM Patent Server/College of Engineering, University of Wisconsin-Madison [retrieved Mar. 7, 2002]. Retrieved from the internet via: http://www.engr.wisc.edu/news/low/1997/Nov24.html.

Delphion/History/The Delphion Story [retrieved Mar. 7, 2002]. Retrieved from the internet via: http://www.delphion.com/about-history.

* cited by examiner

WEB-BASED DOCUMENT SYSTEM

CROSS REFERENCE TO RELATED APPLICATIONS

This is a continuation-in-part application of U.S. Ser. No. 09/558,192, titled On-Line Invention Disclosure Approval System, filed Apr. 26, 2000, and incorporated herein by reference.

BACKGROUND OF INVENTION

The present invention relates to an improved data processing system, and more particularly, to a web-based docketing system that enables users to create, review, approve, store and forward documents. More specifically, the invention relates to an intellectual property management system that solicits inventions, dockets the invention, and enables collaboration between inventors, attorneys, searchers, draftsmen, patent offices and others through a web-based interface.

In many companies, paper submission of forms such as invention disclosures are routinely used. Commonly these paper disclosures are mailed to a central location where they are logged into a system and provided to a patent coordinator or the corporate attorney. In large companies having several offices, these invention disclosures are mailed to the patent department or the patent coordinator. The paper systems are burdensome on staff and the disclosure documents may be subject to loss, misplacement or a misrouting error.

Therefore, there is a need to provide a substantially automated invention disclosure submissions process. Various aspects of such a process may be found in U.S. Pat. Nos. 5,247,661, 5,276,869, 5,317,683, and 5,377,355. These patents all describe various aspects of a data processing system. One drawback to this system described in these patents is that it is an electronic mail (email)-based system. Documents are transmitted back and forth between various locations. The system requires client software on individual user machines. This is particularly cumbersome in a large corporate environment having multiple locations in multiple countries. The drawback being that as migration to new updated software packages is performed, the users in all locations may not have the proper software to access the system. Therefore, certain disclosures may not ever be made due to the inconvenience. The prior patents also describe that the documents are transmitted to each user's machine for processing. Such a system, however, requires high bandwidth to support the exchange of documents from the central location to the user. Such a system, particularly in large corporations, is impractical since large bandwidth allocations for such a system are not desirable ways to use system resources.

It would therefore be desirable to provide an on-line invention disclosure system that does not require high bandwidth or the need for each user to have special software.

Corporate patent departments also typically maintain a docketing system. The docketing system keeps track of the disclosures as they are processed by the patent department. The docketing system maintains the status of disclosures for the patent attorneys and patent coordinators and of any patent applications originating therefrom. Various due dates of the docket system are also tracked. Typically, inventors must call the patent department to determine the status of their invention disclosure because the docket system is inaccessible to them. This process is also time consuming for staff. It would therefore be desirable to provide a system capable of automatically notifying and/or allowing inventors to access some or all of the information in a corporate docketing system so that the status may be readily determined by the inventors.

Typically, invention disclosures are searched prior to preparing a patent application therefrom. Commonly, the disclosures are read and a computer or manual search is performed sometime after the disclosure is submitted. Also, the inventors typically have little input to the process. It would also be desirable to perform a search during the invention disclosure submission process. Consequently, it would also be desirable to allow the inventor to participate or help direct the search.

In paper type systems and in the systems above, one inventor is responsible for preparing the invention disclosure document. It is presumed that concurrence has been achieved between the author of the invention disclosure and the other inventors. Oftentimes this is not achieved and the invention disclosure is processed according to company policies without concurrence. It would therefore be desirable to provide an automated invention disclosure system that does-not allow the disclosure to be processed until concurrence has been reached by each of the inventors.

The U.S. Patent and Trademark Office (UTPTO) has recently introduced systems to receive electronic patent and trademark applications. The electronic patent filing process requires that users have a software system called ePAVE (electronic packaging and validation engine). This system requires that the user enter specific information regarding the application such as the invention title, number of claims, inventor names and addresses and the specification and drawings. The ePAVE system creates several files in a format known as XML (extensible markup language). These XML files contain the various data fields that identify specific portions of the application. These fields are referred to as metadata. Heretofore, the user was required to manually enter the metadata fields into the USPTO web page. These metadata fields are normally already included in the user's own docketing database. This process increased the time needed to prepare and file an electronic application and increased the possibility of errors due to manually retyping the metadata fields.

The current electronic filing process also did not anticipate updating the user's database from information obtained from the USPTO. Items such as serial number, filing date, office actions and due dates were not provided in an electronic format that facilitated updating the user's records.

The electronic filing process also includes submitting scanned copies of declarations and assignments. This requires the difficult and time consuming task of obtaining paper documents from multiple inventors in different locations. The electronic documentation is transmitted to the USPTO as an image that cannot be parsed and automatically entered as a RECORD field in either the user's or the USPTO's database.

Most existing docketing systems remain client/sever where a central sever computer houses the data and users have client software that interfaces with the server. This software architecture requires that the server and users have a direct network connection and utilize the same or compatible operating system. This architecture is difficult to maintain when large number of users in many locations require access to a central server.

Finally, the USPTO still requires that paper copies of prior art reference be forwarded with the electronic application. This is true for commonly available references such as US and foreign patent. Providing scanned copies of prior art, while not yet allowed by the Epave system would be cumbersome and time consuming. A single prior art reference may be needed in many applications. Each application WOULD require a copy of the prior art document.

SUMMARY OF INVENTION

It is therefore one object of the invention to provide a web-based document management system that overcomes the drawbacks of prior known systems. The present invention provides a web-based document approval system that may, for example, be used in cooperation with a corporate intranet and the internet.

The invention enables users to collaborate, create, review and approve documents and to communicate these documents to other parties. In one aspect of the invention an on-line invention disclosure system includes a user computer and a web server having an identification subsystem. A database is coupled to the server. The server provides user screens to the user to prompt users to provide user information to the server. The server receives disclosure information from the users and stores information in the database and prompts the users to provide a password. Upon the proper password, access to the disclosure is granted. Users of the system may work collaboratively to create invention disclosures, patentability searches, patent applications, trademark applications and other types of documents. The system includes an approval function where the document being approved is stored to a central storage area. The central storage area cannot be modified or deleted by the users. Users are invited to review and approve the document and are provided a convenient hyperlink to the specific document. The system records the date and time that each user approved the document as well as the approving text.

In a further aspect of the invention, the central storage area interfaces with a database. The database retrieves approver and approval information and prepares an approval log. The approval log may be in the form of an XML document that easily updates other database systems.

Another advantage of the invention is that users may access information from an on-line system. To provide enhanced security, users from outside a firm or corporation would first be authenticated through the security protocols from the firm's remote access server and then be directed to the hosting database server through secure virtual private networks (VPNs).

Other objects and features of the present invention will become apparent when viewed in light of the detailed description of the preferred embodiment when taken in conjunction with the attached drawings and appended claims.

DETAILED DESCRIPTION

Figure 1:
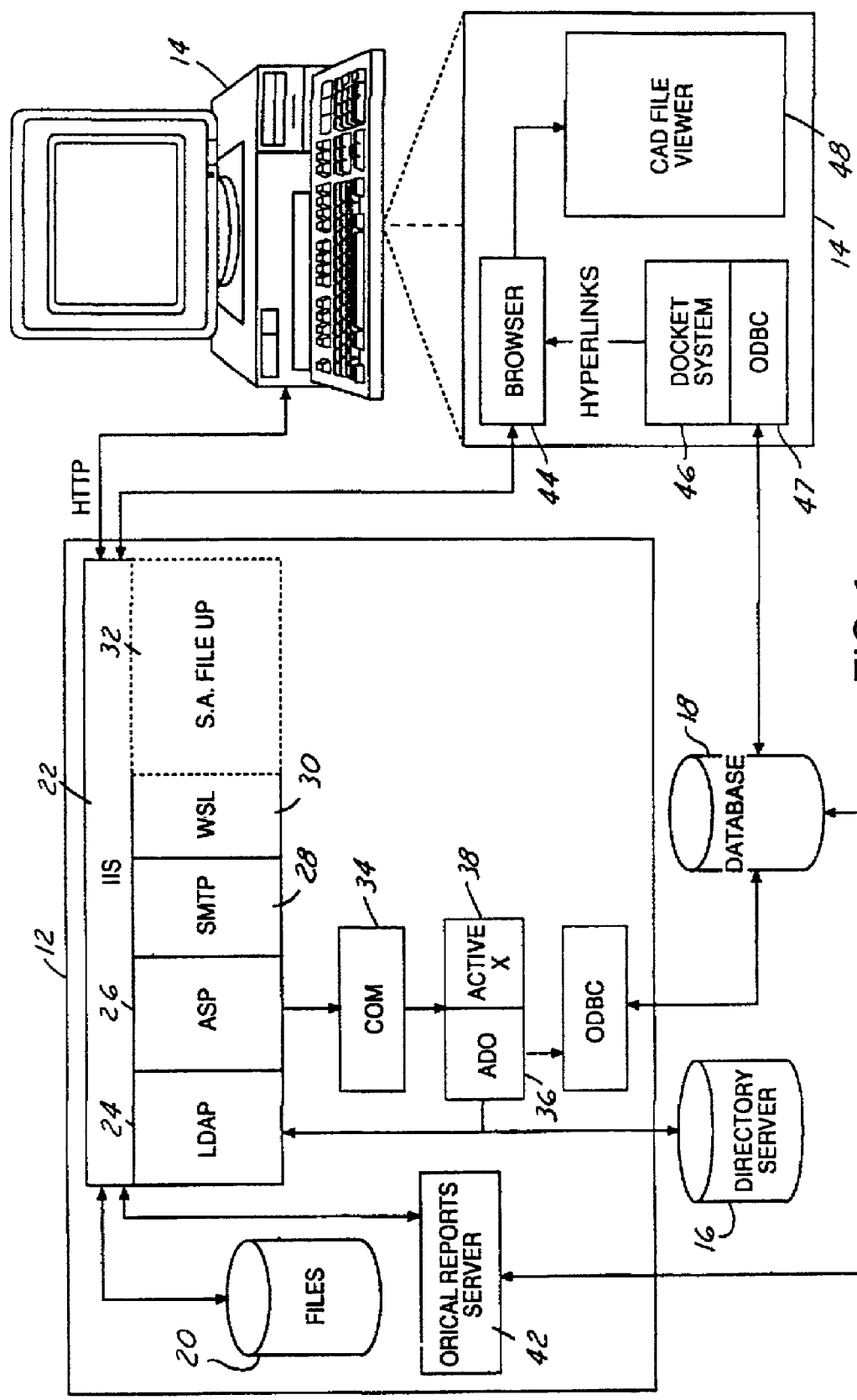
FIG. 1 is a high level block diagram of a disclosure system according to the present invention.

In the following figures the same reference numerals will be used to identify the same components in the various views. Various examples and parameters are set forth in the following description. These are meant to be by way of example and not meant to limit the scope of the invention. The following example describes an on-line invention disclosure system. However, other types of collaborative authoring systems may utilize the same principles and concepts such as authoring technical and other papers.

Referring now to FIG. 1, an on-line invention disclosure system 10 is illustrated. On-line disclosure system 10 is a web-based system having a web server 12 that is coupled to a plurality of users, one of which is shown as user computer 14. The web server 12 as will be further described below may be coupled to a directory server 16 containing user information and to a database system 18. Database 18 may contain both docketing information and disclosure information.

Although illustrated as one, database 18 may be comprised of two or more databases that are linked together. Various tables are established in database 18 and some of the information located in the docket tables may be linked with the disclosure tables as will be further described below.

Web server 12 has a file memory 20 that stores various files therein. Memory 20 is coupled to the Internet Information Server (IIS) 22. IIS 22 controls the operation of the system. IIS 22, for example, may have a lightweight directory access process (LDAP) 24, active server pages (ASP) 26, send mail transfer protocol (SMTP) 28, web single login (WSL) 30, and SAFile-up 32.

LDAP 24 is a protocol for accessing directory server 16. The LDAP 24 permits the retrieval of various user information from the directory server such as the employee's location, phone numbers, etc. in response to the entry of identification information. ASP 26 provides the scripts for the various pages that are viewed by the user. The scripts also control how the information is retrieved from the database 18 and how information is stored therein. Various scripts may be used for various situations in various companies. Preferably, the scripts prompt the user for a complete disclosure that may include a brief summary of the problem solved and a description of the present solution and how it solves the problem. Of course, numerous other categories of information may be prompted.

SMTP 18 provides the formatting for the company specific email system. Various types of email formatting would be evident to those skilled in the art. WSL 30 provides an identification subsystem whereby identification information such as the user's corporate ID and password are authenticated. A password may be established for each disclosure during the initial entry into the system. Thereafter, the password may be used to view the disclosure and view the status thereof. SAFile-up 32 is a software package provided by software artisans that allows the user's PC to couple various documents to the invention disclosure. LDAP 24 is coupled to directory server 16.

ASP 26 is coupled to COM 34. COM 34 are the objects run on server 12. COM 34 is coupled to ADO 36 which is coupled to Active X 38. ADO 36 and Active X are known types of object formatting that allow the information to be displayed in a convenient format. ADO 36 is coupled to ODBC 40, a known type of database driver. ODBC 40 is coupled to docket system 18.

IIS 22 may also be coupled to a report server 42. Report server 42 may be coupled to docket system 18. Report server 42 provides printable reports to the various system users.

IIS 22 may also be coupled to user computer 14 that has a browser 44, a docket system program 46 that is coupled through an ODBC 47 to docket system 18. Browser 44 may be one of the many types of web browsers currently available that is capable of communicating through the common http protocol. The patent staff and patent coordinators may be the only users with direct access to the docket database through docket system program 46 and ODBC 47. Typical users may obtain selected docket information from the docket system through server 12 as will be described below. Browser 44 may also be coupled to file viewers such as a CAD file viewer 48. Some computer aided design (CAD) systems may require an interface to operate with a web browser. CAD file viewer 48 may be one of such systems typically employed on these types of machines. Generally, as will be further described below, the web server 12 retains the various documents while user computers 14 may view selected portions of the document without having to transmit the document back and forth between various users.

Figure 2:
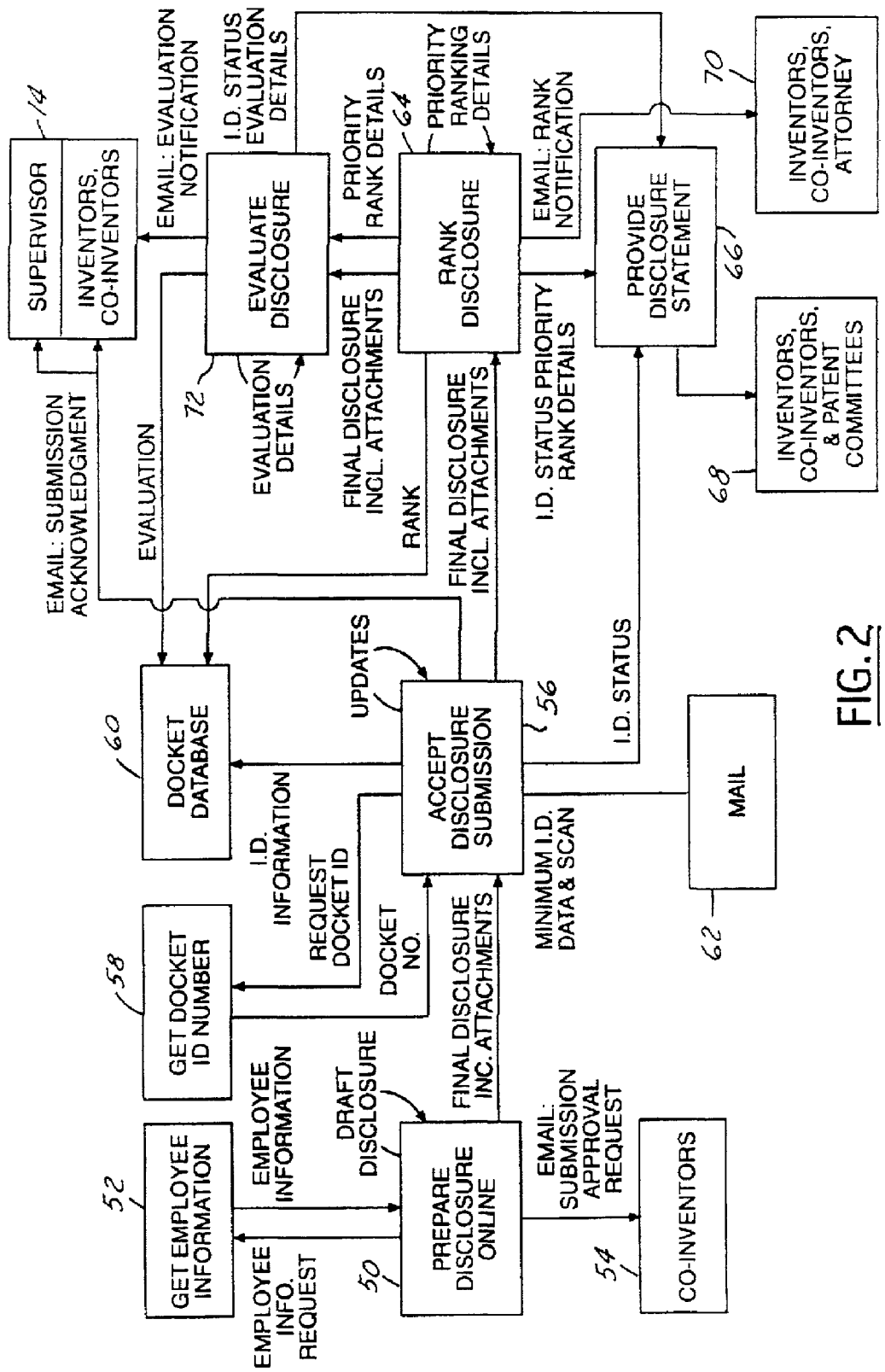
FIG. 2 is a functional flow chart of a disclosure system according to the present invention.

Referring now to FIG. 2, a block diagram of the process of the present invention is illustrated. As is described below, a user may be an inventor or just an author that enters the information in to the disclosure system 10. User and inventor are used interchangeably because in most circumstances the user is an inventor but need not be. The author system allows company personnel to enter inventions by non-company personnel in the system. In block 50, the disclosure is prepared on-line. Passwords or other security measures may be employed through the identification subsystem before access to the system may be gained. Preferably, a corporate directory service or other directory information may be used to assist the user in filling out the disclosure. For example, a get employee information block 52 may be coupled to the prepare disclosure on line block 50 to provide the user information at the user's request in response to some identification information such as an email ID, an employee number or the like. This employee user information thus becomes associated with the particular disclosure being prepared. Block 50 may also allow the user to identify other co-inventors and request approval from co-inventors in block 54. The co-inventors of block 54 are preferably notified via an email that the author has prepared an invention disclosure listing them as a co-inventor and that they should either assist in drafting the disclosure or approve the final draft. For convenience, the email notification may include a hyperlink so that the disclosure and a connection with the server may be obtained. In block 50, the inventor may be asked to fill in predetermined disclosure information such as a brief description or comments, comment on prior art, give a brief description on the new technology provided by the invention, various invention dates, provide classification information such as company classification codes, and miscellaneous other invention information such as whether a government contract was used or if the invention was disclosed to non-company personnel. The prepare disclosure on-line block 50 may also inquire whether other documents exist so that they may be attached to the disclosure as file attachments. The file attachments may be word processing documents, CAD files, presentation documents or various other types of documents.

When approval has been obtained from each co-inventor, the accept disclosure submission block 56 locks the document so no further changes can be made and obtains a docket ID number from a docketing system 58. The disclosure system makes the request and the docket system provides the next available docket number. The docket system in block 60 may also be linked to provide various other information from the on-line invention disclosure system 10.

In addition to accepting disclosures through an on-line system 56, provisions may also be made for accepting mail-in disclosures as was traditionally done. In this manner, the disclosures may be scanned into the system by the patent staff but are received from mail block 62.

Once the disclosure information has been finalized and accepted, block 64 may be performed wherein the disclosures may be ranked. An evaluator may receive an email notice that a disclosure is available in his technology area. The disclosures may be ranked by a patent committee that looks at the priority ranking criteria and evaluates the disclosure accordingly. These details may vary depending on the company. The evaluation may be provided to the docket database in block 60.

Once ranked, the inventors may view the ranking in block 66. By logging on to the system through a web browser or other method, the inventors may monitor the invention disclosure through the process. Various inventors, co-inventors and patent committees in block 68 may be provided various information on the status of the disclosure. This may be done automatically as standardized letters generated by the server 12 or through an email with a hyperlink to the disclosure or the status information. The ranking of the disclosure may also be provided to inventors, co-inventors, and the attorneys responsible in block 70.

After ranking, the responsible attorney may evaluate the invention disclosure in block 72 for patentability. Block 72 is coupled to block 66 so that the disclosure evaluation status may also be provided to inventors, co-inventors and patent committees in block 68. The evaluation of the disclosure may also be provided to the docket database 60. The evaluation of the disclosure in block 72 and the disclosure submission 56 may be provided to a supervisor, inventor or co-inventor by way of email in block 74. The emails preferably contain hyperlinks so that the invention may be easily viewed by clicking on the hyperlink. Further details of the system are described further below.

Figure 3:
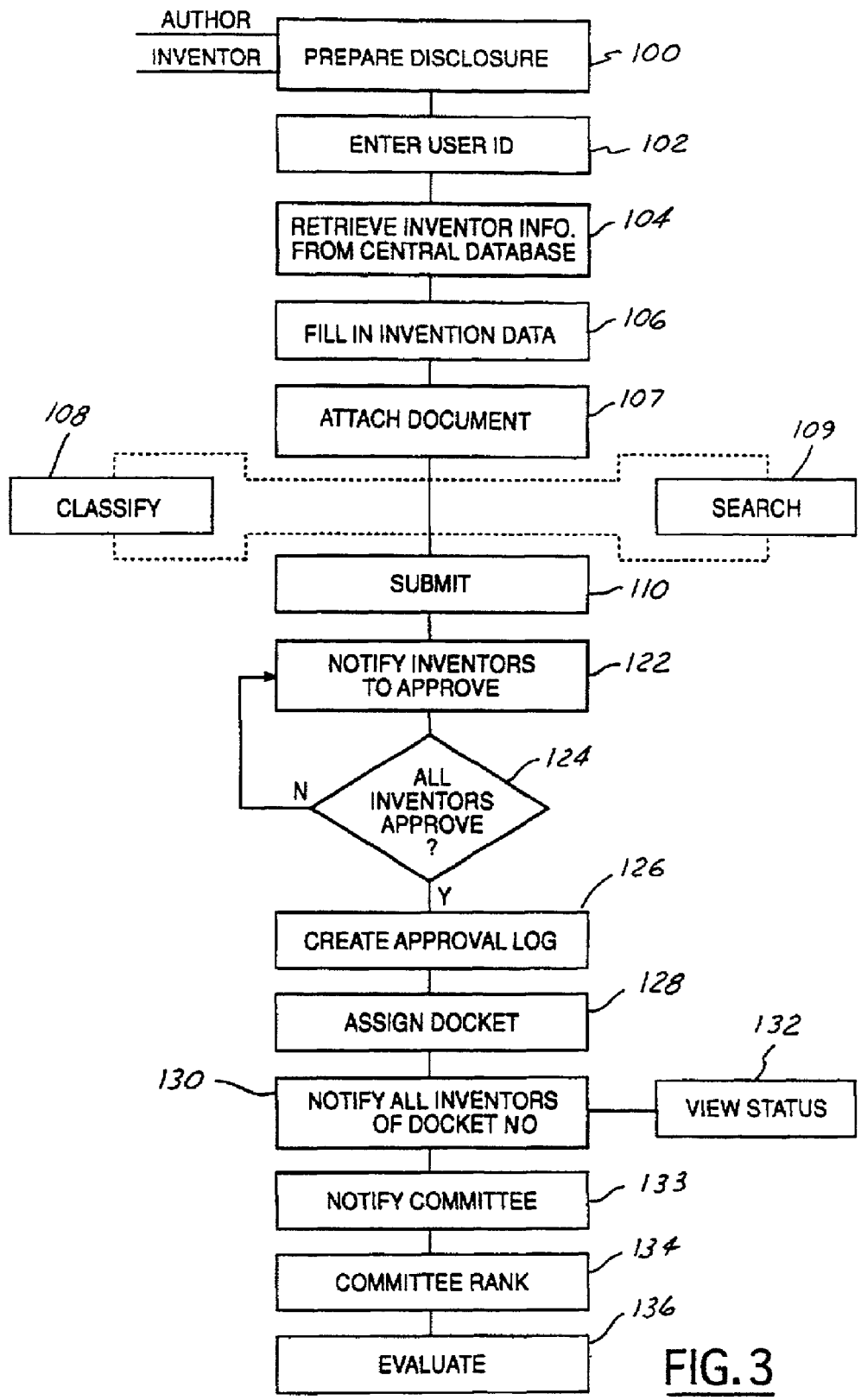
FIG. 3 is a flow chart of the operation of a disclosure system according to the present invention.

Referring now to FIG. 3, the invention disclosure is prepared on-line in step 100. An author or inventor may prepare the invention disclosure. Preferably, the author or inventor or both obtain access through a corporate Intranet or the Internet. In step 102, the user enters identification information (ID) for the system. This may also consist of a password or other security if this is a subsequent access to the system. The following, however, is based upon an initial submission of an invention disclosure. In step 104, the information may be received from a central database or directory server maintained by the company. Various invention data is filled into the disclosure in step 106. As described above, the invention data is preferably as detailed information as the inventor may provide. The invention data may be prompted from the on-line disclosure system through a series of direct questions and answers, or the user may be directed to various segments where broad questions are answered and the inventor may expound, or a combination of both. In step 107, if any documents such as prints, flow charts, CAD files or other information would be helpful to the preparation of a patent application from the disclosure, the documents may be attached so that they are stored in the system with the disclosure.

Optional steps 108 and 109 may also be performed. Step 108 classifies invention disclosure based on the information filled therein. Step 108 is further described below. In step 109, a search may be prompted using the various information from the system. The search may also interact with the inventor to determine whether the search is finding appropriate information. The search step 109 also is further described below.

In step 110, the invention disclosure is submitted as a draft by the author. This draft submission is an approval by the author/inventor. In step 122, the other inventors are notified to approve the invention disclosure. As mentioned above, the notification may be an email with a hyperlink to the disclosure on the on-line system in a web-based manner. In step 124, if all inventors do not approve the disclosure then step 122 is executed again. If other inventors change the invention disclosure then approval for the changed draft should be obtained from all other inventors including the authoring inventor. When all the inventors approve the document, the document is locked to prevent further changes. Preferably, an approval log becomes associated with the invention disclosure once all the inventors approve the invention disclosure in step 126. The approval log will demonstrate that each inventor reviewed and approved the same final version of the disclosure. Approval in step 124 may also entail a variety of other functions including agreeing to an associated document such as an assignment of the invention, a power of attorney or other bookkeeping functions.

After approval, the disclosure becomes permanently and unchangeably (locked) part of the system by receiving a docket number assigned in step 128 so that tracking may be provided. The docket number is obtained from the docket system. In step 130, all inventors are notified of the docket number. The inventors may view the status in step 132 of the invention. Preferably, notification takes place by way of email and may have a predetermined letter with a hyperlink therein. The hyperlink may be used to provide quick access to the system through the corporate Intranet or the Internet.

In step 133, an invention ranking committee or committees are notified to rank the invention disclosure. If a number of committees are used, the proper committee may be assigned by the corporate classification code entered by the inventor/author. The committee ranks the disclosure in step 134. The system may also set an evaluation meeting of various committee members to rank the disclosure. To view the disclosure the committee members may click on a hyperlink from an email or otherwise access the invention disclosure system. A ranking sheet or screen with various ranking criteria may become associated with the disclosure. The committee ranking may be provided to the inventors through notification such as an email or the disclosure may be accessed by the inventors from a previous notification.

In step 136, the invention disclosure may be automatically assigned to a member of the patent staff for evaluation based upon the corporate classification code. At all times the patent staff, the inventors and committee members preferably may access the system to obtain information as to the status of the system.

Figure 4:
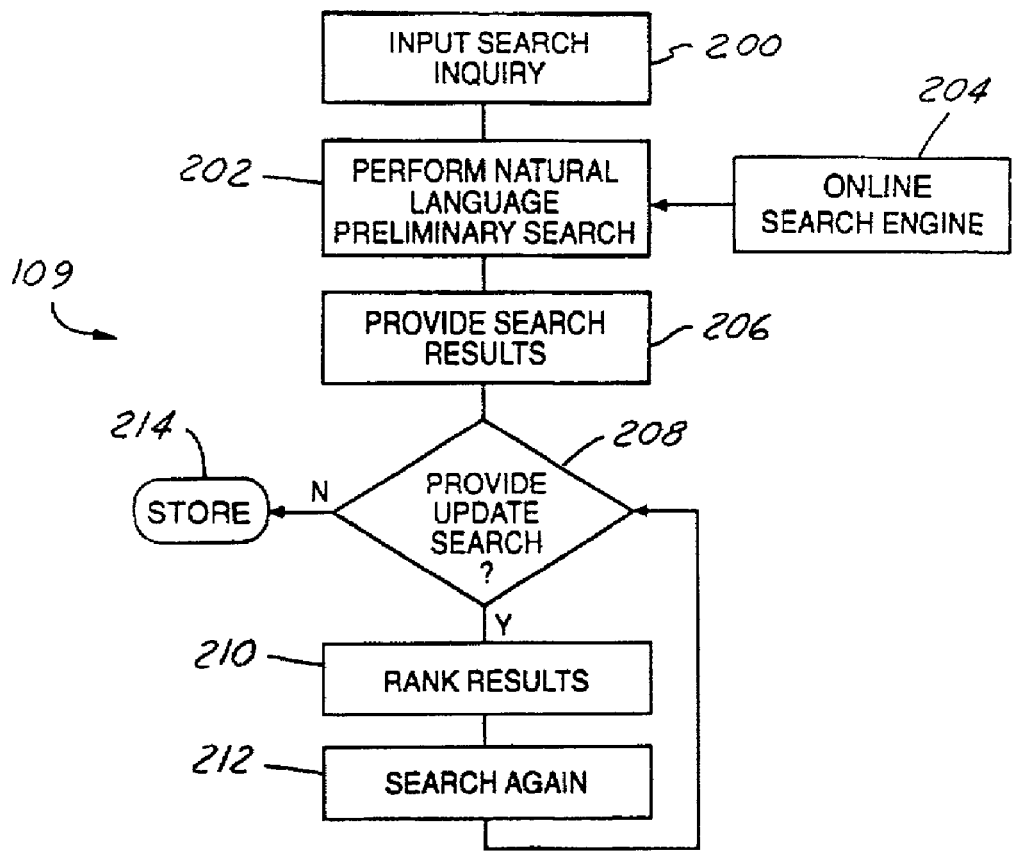
FIG. 4 is a flow chart of a search process according to the present invention.

Referring now to FIG. 4, step 109 is illustrated in further detail. In step 109, an optional search function may be included with the on-line invention disclosure system. The search is provided to give evaluators the state of the art to assist in their evaluation. A search inquiry is formulated in step 200. The search inquiry may be manually entered or search terms may be derived from the disclosure itself. Boolean searching may be performed. Preferably, natural language searching may be performed from using selected sections of the invention disclosure that may include a detailed description section or the problem/solution section.

Also, the user may be prompted to enter search terms to be used in addition to the disclosure information. Various types of natural searching language engines may be used. Typically, these natural language search engines rank the various terms of the search inquiries such as the portions of the invention disclosure and perform a search through various on-line search engines from various search vendors through a natural language search as shown in step 202. On-line search engines 204 provide the results of the search to the user. This preferably is a required step although the on-line disclosure system may make this step optional. The on-line search engine may include, for example, interfacing with the patent office website, or various other commercial searching websites known to those skilled in the art. Many corporations subscribe to a commercial search service vendor. In step 204, the results of the search are provided to the inventor. The results may, for example, provide the top ten results from the search. In step 208, the inventor may be prompted to provide a narrower search. In step 208 the search may be refined using the various terms received from the documents of the first search or previous searches and the search terms from the disclosure document. For example, various documents can be selected as being on point and the wording from these documents may be weighted in addition to the prior search in step 210. Other documents that are not relevant may receive a negative weighting so that similar documents do not appear on the list of most relevant documents. The invention disclosure information may then be repeatedly searched again in step 212 in view of the revised terms. Referring back to step 208, after the search has been sufficiently refined, the results are stored together with the disclosure in step 214.

Figure 5:
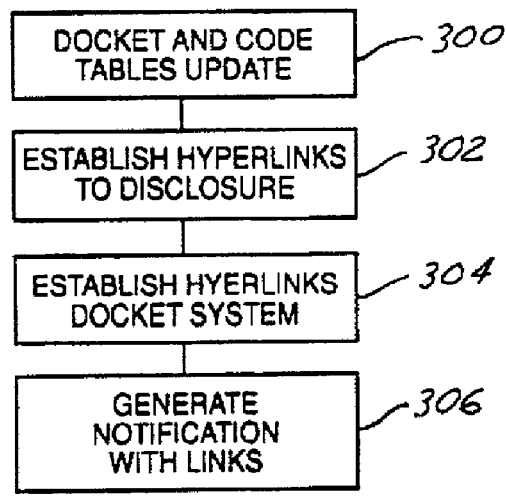
FIG. 5 is a flow chart of a docket system according to the present invention.

Referring now to FIG. 5, the invention disclosure system may also be coupled to an on-line docket system. Various information may be shared between the docket system and the on-line invention disclosure system. For example, common information such as a date stamp may be provided as well as other information not limited to the title, the classification code, inventor name, an inventor acknowledgement and an assignment. This information may be provided to the docketing system in step 300.

The approval system used to for invention disclosures may be used to approve patent application drafts or any other type of document. This approval process consists on notifying the inventors by email that a draft patent application has be loaded to the docketing system and inviting each inventor to review and approve the application. Each inventor logs into the system through WSL, thus verifying their identify and reviews the specification and drawings. The inventors are asked to approve the application draft by reviewing a message and selecting a button labeled "I agree".

Upon approval, for example, the docketing system may provide a docket number to the disclosure system as mentioned above. In step 302, hyperlinks may be established to the disclosure for use by the various committees, the patent staff evaluator, and the inventors. This hyperlink may also require the establishment of a password to enter the system and access the particular disclosure. Preferably, each inventor only has access to their own disclosures. Patent committee members preferably have access to all disclosures that have been submitted by the various inventors whose area of technology (corporate classification code) is within that of the particular committee. Hyperlinks may be established to the docket system in step 304. Various notifications may be provided to the inventors and the patent committee members through emails or otherwise with various hyperlinks to the sites in step 306.

The system may preferably be installed on an internet accessible server to enable access from any internet connected computer. This is typically located on an extranet or secure internet server. When the docketing system is located on an extranet, a proxy server similar to the WSL described above provides access through a firewall. When the docketing system is located on the internet, it may be preferable to provide a VPN between the user's facility and the docketing system server. There are many commercial VPNs but most include encryption and digital certificates such as PKI (public key infrastructure). The encryption feature prevents intercepting transmissions between the client and server. The certificates prevent authorized users from access a network.

The customer server preferably includes a WSL authentication login and a VPN client. The VPN client includes a client certificate and a unique internet protocol (IP) address. Users log into the customer server and are then directed to the internet-hosted docketing system. The docketing system only allows access through the VPN after verifying both the referring IP address and the authorized certificate. Users trying to access the docketing system without passing through the client VPN are denied access.

When the database is hosted on the internet, it may be difficult to connect with the customer LDAP server. In this case, it is preferable that the WSL authentication process also includes an LDAP lookup that transmits the various user information to the internet-based docketing system. This information may be transmitted as a locally saved cookie, an XML file transmitted to the docketing system or by other means.

In another embodiment of the preferred invention, the system displays approval text. This text may be a declaration and assignment. The user approves the application and agrees to the terms of the approval text. The docketing system saves information about the approved document as well as the date and time of each inventor's approval and the approval text for the declaration and assignment. The security and recordation functions of the docketing system are designed to comply with the Electronic Signatures Act (Public Law No: 106-229) and elminate the need for signed paper documents.

A record associating each approval record with a file record is stored in the file storage area. The docketing system may create an approval log of each inventor's approval. This log may be exported as an XML file compatible with the USPTO's ePAVE system to obviate the need for separately scanning and attaching TIF images of declaration and assignment documents. The XML file also contains metadata of inventor information obviating the need to retype that information.

The docketing system may be easily adapted to provide for two-way communication between the USPTO and docketing system. Currently, the USPTO's USPTO Direct Software transmits a serial number from the USPTO's server to the user's PC. This transmission process requires a direct PPP (point to point protocol) connection between the USPTO and client computers. It cannot be used to timely transmit office actions and other information because it requires that both machines be simultaneously connected.

The present invention proposes a system where the USPTO sends a notification via email to the user notifying the user that an office action has been issued by the USPTO. The user either manually or automatically logs into the USPTO's server to retrieve the action. The retrieval may utilize the same PKI certificates used to transmit applications. The office actions should preferably be in the form of XML files so that relevant metadata such as serial numbers, due dates, examiner, group art unit and telephone information may be easily parsed and recorded into the docketing system. The docketing system then notifies the attorney or docketing clerk via an email that a new action has been received. The notice contains a hyperlink to the action as well as due dates for response.

The system optionally includes a system to reference prior art documents and a method hyperlinks to the stored reference. The USPTO requires disclosure of relevant references kno current rules require that paper copies of these references be provided with the patent appl applicant must later forward these paper copies. The present invention anticipates a method Information Disclosure Statement in XML form that contains hyperlinks to identified docume the USPTO Patent Full Text and Image Database or the European Patent Office (EPO) esp@ce and the EPO maintain databases using Uniform Resource Locator (URL)-based systems wher U.S. Pat. No. 5,579,858 may currently be view through the hyperlink:"http://164.195.100 Sect 1 =PTO 1 &Sect 2 =HITOFF&d=PALL&p=1&u=/netahtml/srchnum.htm&r=1&f=G&I=50&s1

In those instances where there is no internet accessible archive, the present invention contemplates commercial prior art services that will host the document for permanent record storage. Access to the public and patent offices would be through a web interface or URL link as described. One example of a commercial internet-based prior art archive is IP.COM whose web page 15 www.ip.com. Linking the prior art eliminates the need to submit paper copies. Only one copy of the reference is needed for use with many applications.

The docketing system records the prior art reference either through a citation system such as patent number (country, number, kind) or through a uniform citation system as are commonly used in technical journals. The docketing system prepares an information disclosure statement where the citation system links to a repository on the internet that contains the referenced document. The information disclosure system is preferably transmitted as an XML file having hyperlinks to each reference.

While particular embodiments of the invention have been shown and described, numerous variations alternate embodiments will occur to those skilled in the art. The example describes an on-line invention disclosure system. Other types of collaborative authoring systems may utilize the same principles and concepts such as authoring technical and other papers. Accordingly, it is intended that the invention be limited only in terms of the appended claims.

The invention claimed is:

1. A method of approving a document comprising:
   storing the document in a central storage area, the storage area preventing alternation or modification of the document during the approval process; advising an approver that the document requiring approval is accessible for review and approval;
   allowing the approver to review the document; prompting approval of the document by the approver, said prompting step includes displaying approval text;
   obtaining the approver's agreement to the document and to the approval text;

recording the date of approval; and recording the displayed approval text for the approved document.

2. A method of claim as recited in claim 1, further comprising the step of generating an approval log.

3. A method as recited in claim 2, further comprising associating the approval log with a unique file record.

4. A method as recited in claim 3, further comprising processing the approval log into an XML file.

5. A method as recited in claim 1, further comprising multiple approvers approving a document and recording each approver's approval.

6. A method as recited in claim 2, wherein the advising step comprises providing an email to the approver and proving a hyperlink to the document.

7. A method as recited in claim 1, wherein the document is selected from a group consisting of a patent application, a trademark application, an assignment document and a power of attorney.

8. A method as recited in claim 1, further comprising the step of allowing access to the central storage area to view the approval record.

9. A method as recited in claim 1, further comprising storing this approval text in the central storage area.

10. A method as recited in claim 1, further comprising:
after said prompting approval step, an approver rejects the document;
repeating advising an approver that the document requiring approval is accessible for review and approval;
repeating allowing the approver to review the document; and
repeating prompting approval by the approver.

11. A method of approving a document comprising:
(a) storing the document in a central storage area, the storage area preventing alternation or modification of the document during the approval process;
(b) advising two or more approvers that the document requiring approval is accessible for review and approval;
(c) allowing each approver to review the document;
(d) prompting approval by each approver, said prompting step includes displaying approval text;
(e) at least one of said approvers rejecting the document;
(f) repeating said advising step (b);
(g) repeating said allowing step (c);
(h) repeat said prompting step (d);
(i) obtaining approval by each approver' agreement to the document and to the approval text;
(j) recording the date of approval for each approver;
(k) recording the approval text; and
(l) recording the displayed approval text for the approved document.

12. A method as recited in claim 11, further comprising between step and step (ef), changing said document.

13. A method as recited in claim 11, wherein said two or more approvers approved the same document.

14. A method of approving an invention disclosure document comprising:
storing the disclosure in a central storage area, the storage area preventing alternation or modification of the disclosure during the approval process;
advising two or more inventors that the disclosure requiring approval is accessible for review and approval;
allowing each inventor to review the disclosure;
prompting approval by each inventor, said prompting step includes displaying approval text for the disclosure;
obtaining approval from each inventor; recording the date of approval for each inventor; and
recording the displayed approval text for the approved disclosure.

15. A method of approving a patent application document comprising:
storing the application in a central storage area, the storage area preventing alternation or modification of the application during the approval process;
advising an approver that the application requiring approval is accessible for review and approval;
allowing the approver to review the application;
prompting approval the by the approver, said prompting step includes displaying approval text for the application;
obtaining approval the approver;
recording the date of approval from the approver; and
recording the displayed approval text the approver agreed to when the approver approved the application.

16. A method of approving an invention disclosure document comprising:
(a) storing the disclosure in a central storage area, the storage area preventing alternation or modification of the document during the approval process;
(b) advising two or more approvers that the disclosure requiring approval is accessible for review and approval;
(c) allowing each approver to review the disclosure;
(d) prompting approval by each approver, said prompting step includes displaying approval text;
(e) at least one of said approvers rejecting the disclosure;
(f) repeating said advising step (b);
(g) repeating said allowing step (C);
(h) repeat said prompting step (d);
(i) obtaining approval by each approvers' agreement to the disclosure and to the approval text;
(j) recording the date of approval for each approver;
(k) recording the approval text; and
(i) recording the displayed approval text for the approved disclosure.

17. A method of approving a patent application comprising:
(a) storing the application in a central storage area, the storage area preventing alternation or modification of the document during the approval process;
(b) advising two or more approvers that the application requiring approval is accessible for review and approval;
(c) allowing each approver to review the application;
(d) prompting approval by each approver, said prompting step includes displaying approval text;
(e) at least one of said approvers rejecting the application;
(f) repeating said advising step (b);
(g) repeating said allowing step (c);
(h) repeat said prompting step (d);
(i) obtaining approval by each approvers' agreement to the application and to the approval text;
recording the date of approval for each approver;
(k) recording the approval text; and
(l) recording the displayed approval text for the approved application.

* * * * *